(12) United States Patent
Acharya et al.

(10) Patent No.: US 11,900,499 B2
(45) Date of Patent: Feb. 13, 2024

(54) ITERATIVE INDIRECT COMMAND BUFFERS

(71) Applicant: Advanced Micro Devices, Inc., Santa Clara, CA (US)

(72) Inventors: Anirudh Rajendra Acharya, San Diego, CA (US); Ruijin Wu, San Diego, CA (US); Alexander Fuad Ashkar, Orlando, FL (US); Harry J. Wise, Orlando, FL (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 16 days.

(21) Appl. No.: 17/028,803

(22) Filed: Sep. 22, 2020

(65) Prior Publication Data

US 2021/0304349 A1    Sep. 30, 2021

Related U.S. Application Data

(60) Provisional application No. 63/002,763, filed on Mar. 31, 2020.

(51) Int. Cl.
| | |
|---|---|
| *G06T 1/20* | (2006.01) |
| *G06F 9/54* | (2006.01) |
| *G06F 9/38* | (2018.01) |
| *G06T 7/60* | (2017.01) |

(52) U.S. Cl.
CPC .............. *G06T 1/20* (2013.01); *G06F 9/3836* (2013.01); *G06F 9/544* (2013.01); *G06T 7/60* (2013.01)

(58) Field of Classification Search
CPC . G06T 1/20; G06T 7/60; G06F 9/3836; G06F 9/544
USPC .......................................................... 345/522
See application file for complete search history.

(56) References Cited

U.S. PATENT DOCUMENTS

| | | | | |
|---|---|---|---|---|
| 2015/0287158 | A1* | 10/2015 | Cerny | G09G 5/14 345/553 |
| 2017/0018120 | A1* | 1/2017 | Li | G06T 19/006 |
| 2017/0084052 | A1* | 3/2017 | Olsson | G01C 11/02 |
| 2017/0199749 | A1* | 7/2017 | Wolfson | G06F 9/451 |
| 2019/0066255 | A1* | 2/2019 | Nalluri | G06T 15/005 |
| 2019/0258512 | A1* | 8/2019 | Agarwal | G06F 16/9024 |
| 2020/0151510 | A1* | 5/2020 | Vishnu | G06F 18/2148 |

* cited by examiner

*Primary Examiner* — James A Thompson
*Assistant Examiner* — Kim Thanh T Tran
(74) *Attorney, Agent, or Firm* — Volpe Koenig

(57) ABSTRACT

A technique for executing commands for an accelerated processing device is provided. The technique includes obtaining an iteration number and predication data from metadata for an iterative indirect command buffer; for each iteration indicated by the iteration number, performing commands of the iterative indirect command buffer as specified by the predication data; and ending processing of the iterative indirect command buffer in response to processing a number of iterations equal to the iteration number.

18 Claims, 8 Drawing Sheets

ITERATIVE INDIRECT COMMAND BUFFERS

CROSS-REFERENCE TO RELATED APPLICATIONS

This application claims the benefit of U.S. Provisional application No. 63/002,763, entitled "ITERATIVE INDIRECT COMMAND BUFFERS," filed on Mar. 31, 2020, the entirety of which is hereby incorporated herein by reference.

BACKGROUND

Three-dimensional ("3D") graphics processing pipelines perform a series of steps to convert input geometry into a two-dimensional ("2D") image for display on a screen.

BRIEF DESCRIPTION OF THE DRAWINGS

A more detailed understanding can be had from the following description, given by way of example in conjunction with the accompanying drawings wherein.

DETAILED DESCRIPTION

A technique for executing commands for an accelerated processing device is provided. The technique includes obtaining an iteration number and predication data from metadata for an iterative indirect command buffer; for each iteration indicated by the iteration number, performing commands of the iterative indirect command buffer as specified by the predication data; and ending processing of the iterative indirect command buffer in response to processing a number of iterations equal to the iteration number.

Figure 1:
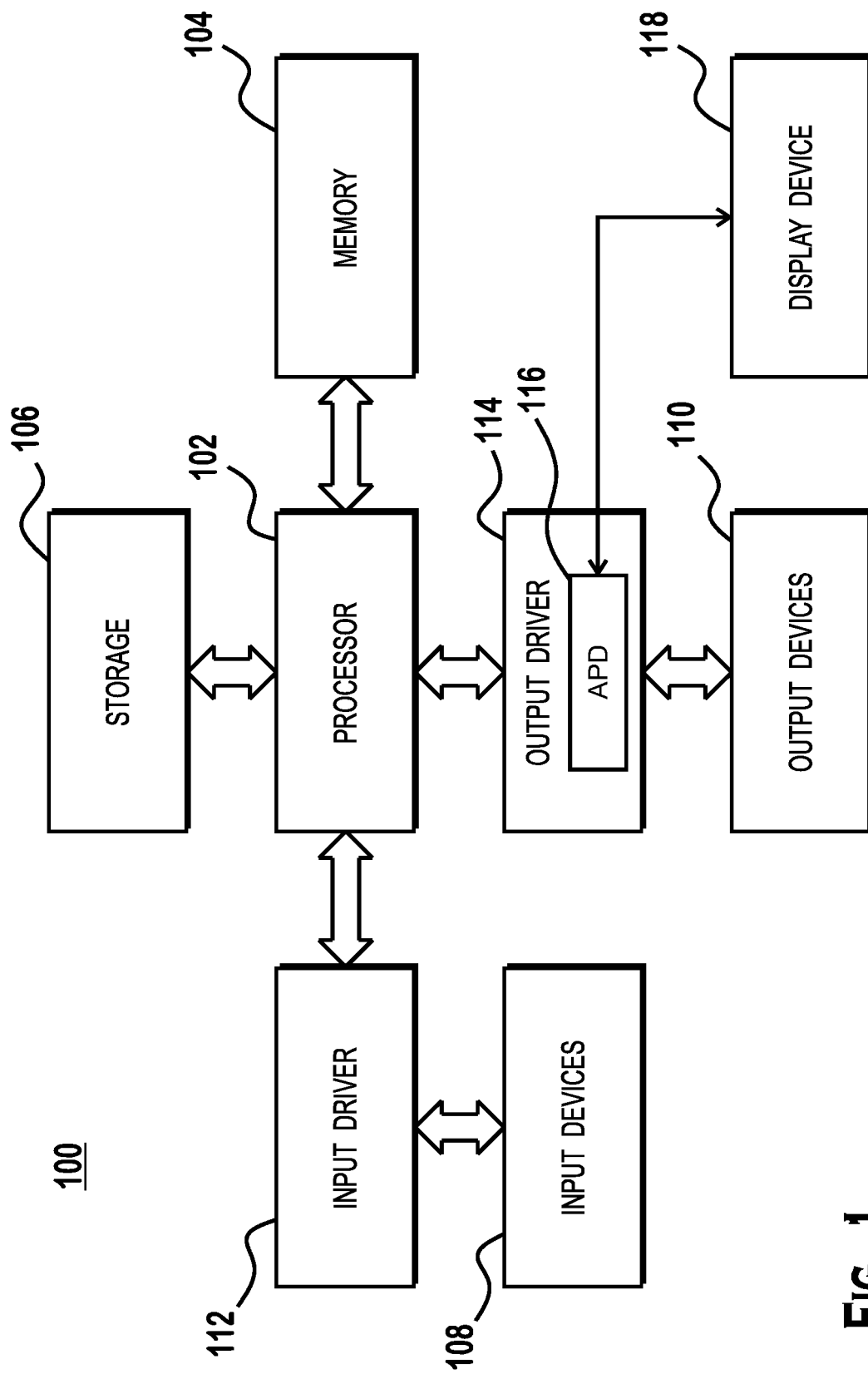
FIG. 1 is a block diagram of an example device in which one or more features of the disclosure can be implemented.

FIG. 1 is a block diagram of an example device 100 in which one or more features of the disclosure can be implemented. The device 100 could be one of, but is not limited to, for example, a computer, a gaming device, a handheld device, a set-top box, a television, a mobile phone, a tablet computer, or other computing device. The device 100 includes a processor 102, a memory 104, a storage 106, one or more input devices 108, and one or more output devices 110. The device 100 also includes one or more input drivers 112 and one or more output drivers 114. Any of the input drivers 112 are embodied as hardware, a combination of hardware and software, or software, and serve the purpose of controlling input devices 112 (e.g., controlling operation, receiving inputs from, and providing data to input drivers 112). Similarly, any of the output drivers 114 are embodied as hardware, a combination of hardware and software, or software, and serve the purpose of controlling output devices 114 (e.g., controlling operation, receiving inputs from, and providing data to output drivers 114). It is understood that the device 100 can include additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, without limitation, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 and output driver 114 include one or more hardware, software, and/or firmware components that are configured to interface with and drive input devices 108 and output devices 110, respectively. The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. The output driver 114 includes an accelerated processing device ("APD") 116 which is coupled to a display device 118, which, in some examples, is a physical display device or a simulated device that uses a remote display protocol to show output. The APD 116 is configured to accept compute commands and graphics rendering commands from processor 102, to process those compute and graphics rendering commands, and to provide pixel output to display device 118 for display. As described in further detail below, the APD 116 includes one or more parallel processing units configured to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and configured to provide graphical output to a display device 118. For example, it is contemplated that any processing system that performs processing tasks in accordance with a SIMD paradigm may be configured to perform the functionality described herein. Alternatively, it is contemplated that computing systems that do not perform processing tasks in accordance with a SIMD paradigm performs the functionality described herein.

Figure 2:
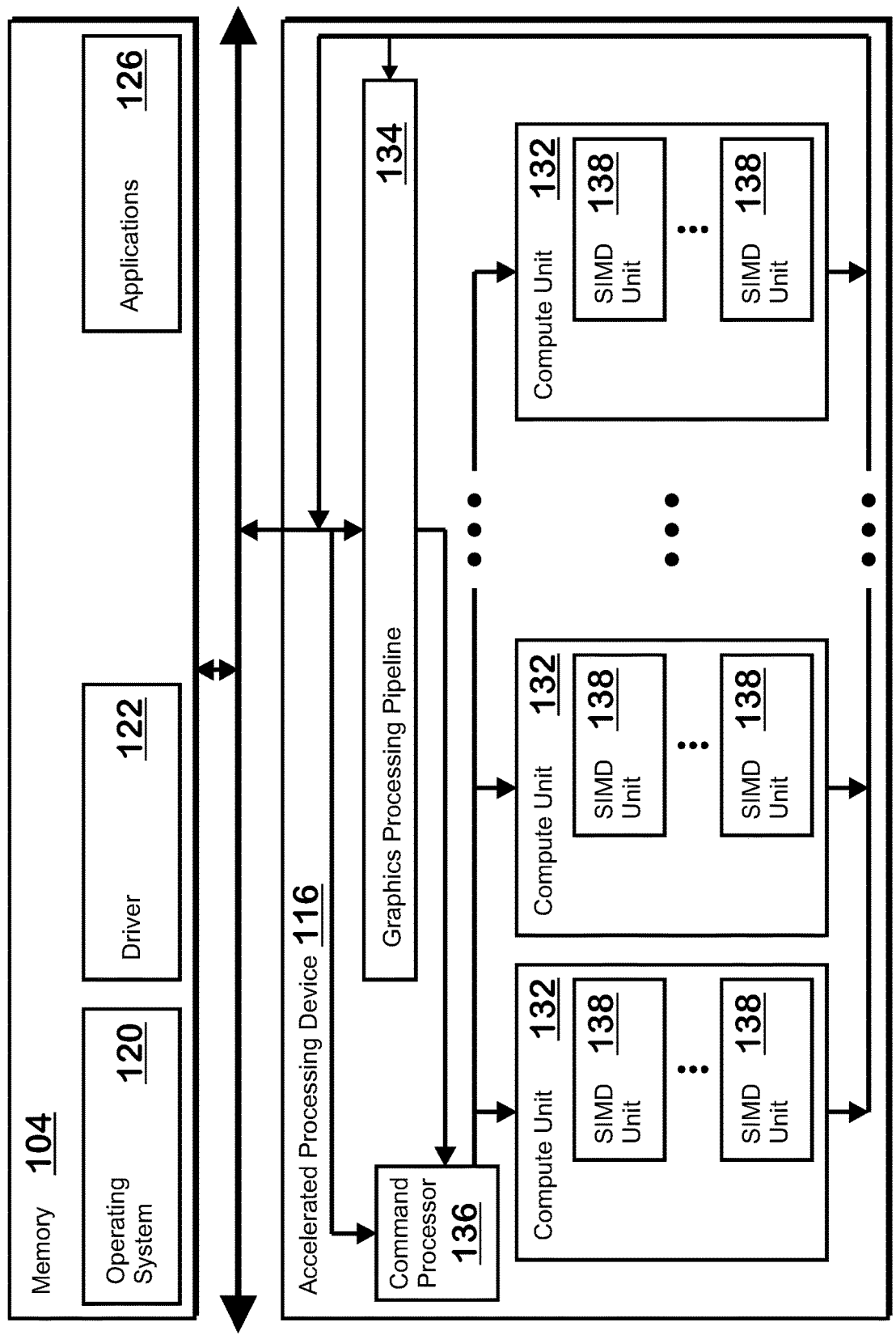
FIG. 2 illustrates details of the device of FIG. 1, according to an example.

FIG. 2 illustrates details of the device 100 and the APD 116, according to an example. The processor 102 (FIG. 1) executes an operating system 120, a driver 122, and applications 126, and may also execute other software alternatively or additionally. The operating system 120 controls various aspects of the device 100, such as managing hardware resources, processing service requests, scheduling and controlling process execution, and performing other operations. The APD driver 122 controls operation of the APD 116, sending tasks such as graphics rendering tasks or other work to the APD 116 for processing. The APD driver 122 also includes a just-in-time compiler that compiles programs for execution by processing components (such as the SIMD units 138 discussed in further detail below) of the APD 116.

The APD 116 executes commands and programs for selected functions, such as graphics operations and non-graphics operations that may be suited for parallel processing. The APD 116 can be used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102. In some examples, these compute processing operations are performed by executing compute shaders on the SIMD units 138.

The APD 116 includes compute units 132 that include one or more SIMD units 138 that are configured to perform operations at the request of the processor 102 (or another unit) in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow.

The basic unit of execution in compute units 132 is a work-item. Each work-item represents a single instantiation of a program that is to be executed in parallel in a particular lane. Work-items can be executed simultaneously (or partially simultaneously and partially sequentially) as a "wavefront" on a single SIMD processing unit 138. One or more wavefronts are included in a "work group," which includes a collection of work-items designated to execute the same program. A work group can be executed by executing each of the wavefronts that make up the work group. In alternatives, the wavefronts are executed on a single SIMD unit 138 or on different SIMD units 138. Wavefronts can be thought of as the largest collection of work-items that can be executed simultaneously (or pseudo-simultaneously) on a single SIMD unit 138. "Pseudo-simultaneous" execution occurs in the case of a wavefront that is larger than the number of lanes in a SIMD unit 138. In such a situation, wavefronts are executed over multiple cycles, with different collections of the work-items being executed in different cycles. An APD command processor 136 is configured to perform operations related to scheduling various workgroups and wavefronts on compute units 132 and SIMD units 138.

The parallelism afforded by the compute units 132 is suitable for graphics related operations such as pixel value calculations, vertex transformations, and other graphics operations. Thus in some instances, a graphics pipeline 134, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

Figure 3:
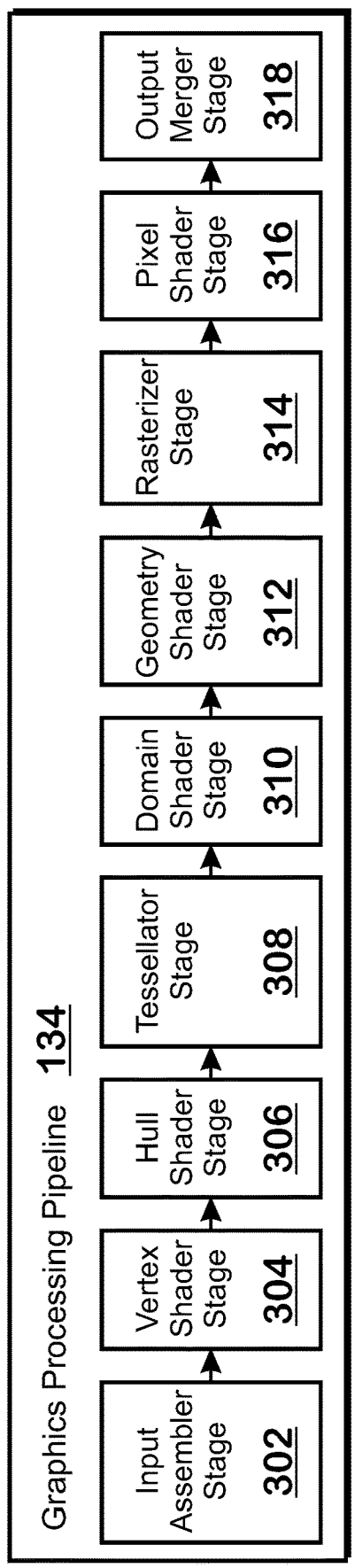
FIG. 3 is a block diagram showing additional details of the graphics processing pipeline illustrated in FIG. 2.

FIG. 3 is a block diagram showing additional details of the graphics processing pipeline 134 illustrated in FIG. 2. The graphics processing pipeline 134 includes stages that each performs specific functionality of the graphics processing pipeline 134. Each stage is implemented partially or fully as shader programs executing in the programmable compute units 132, or partially or fully as fixed-function, non-programmable hardware external to the compute units 132.

The input assembler stage 302 reads primitive data from user-filled buffers (e.g., buffers filled at the request of software executed by the processor 102, such as an application 126) and assembles the data into primitives for use by the remainder of the pipeline. The input assembler stage 302 can generate different types of primitives based on the primitive data included in the user-filled buffers. The input assembler stage 302 formats the assembled primitives for use by the rest of the pipeline.

The vertex shader stage 304 processes vertices of the primitives assembled by the input assembler stage 302. The vertex shader stage 304 performs various per-vertex operations such as transformations, skinning, morphing, and per-vertex lighting. Transformation operations include various operations to transform the coordinates of the vertices. These operations include one or more of modeling transformations, viewing transformations, projection transformations, perspective division, and viewport transformations, which modify vertex coordinates, and other operations that modify non-coordinate attributes.

The vertex shader stage 304 is implemented partially or fully as vertex shader programs to be executed on one or more compute units 132. The vertex shader programs are provided by the processor 102 and are based on programs that are pre-written by a computer programmer. The driver 122 compiles such computer programs to generate the vertex shader programs having a format suitable for execution within the compute units 132.

The hull shader stage 306, tessellator stage 308, and domain shader stage 310 work together to implement tessellation, which converts simple primitives into more complex primitives by subdividing the primitives. The hull shader stage 306 generates a patch for the tessellation based on an input primitive. The tessellator stage 308 generates a set of samples for the patch. The domain shader stage 310 calculates vertex positions for the vertices corresponding to the samples for the patch. The hull shader stage 306 and domain shader stage 310 can be implemented as shader programs to be executed on the compute units 132 that are compiled by the driver 122 as with the vertex shader stage 304.

The geometry shader stage 312 performs vertex operations on a primitive-by-primitive basis. A variety of different types of operations can be performed by the geometry shader stage 312, including operations such as point sprite expansion, dynamic particle system operations, fur-fin generation, shadow volume generation, single pass render-to-cubemap, per-primitive material swapping, and per-primitive material setup. In some instances, a geometry shader program that is compiled by the driver 122 and that executes on the compute units 132 performs operations for the geometry shader stage 312.

The rasterizer stage 314 accepts and rasterizes simple primitives (triangles) generated upstream from the rasterizer stage 314. Rasterization consists of determining which screen pixels (or sub-pixel samples) are covered by a particular primitive. Rasterization is performed by fixed function hardware.

The pixel shader stage 316 calculates output values for screen pixels based on the primitives generated upstream and the results of rasterization. The pixel shader stage 316 may apply textures from texture memory. Operations for the pixel shader stage 316 are performed by a pixel shader program that is compiled by the driver 122 and that executes on the compute units 132.

The output merger stage 318 accepts output from the pixel shader stage 316 and merges those outputs into a frame buffer, performing operations such as z-testing and alpha blending to determine the final color for the screen pixels.

To control the execution of various commands on the APD 116, an application 126 or other software submits commands to the APD 116 for execution. In one operation mode, application 126 transmits the commands and the command processor 136 of the APD 116 executes those commands as the commands are received. However, in this mode of operation, the application 126 and thus the processor 102 is occupied with the task of transmitting such commands to the APD 116 for each such command that is to be executed.

Thus the command processor 136 is also capable of executing commands of an indirect buffer. Indirect buffers, store commands for execution by the APD 116 as described herein. A primary buffer, which is the "top level" command buffer from which the command buffer 136 executes commands by default, is permitted to include one or more "indirection commands." Each indirection command includes a pointer to an indirect buffer. Upon encountering an indirection command, the command buffer traverses the pointer to the indirect buffer, executes the commands in the indirect buffer, and returns to the primary buffer. This form of execution reduces the burden on the processor 102 by allowing the command processor 136 to execute commands that are stored in a buffer (the indirect command buffer) rather than requiring that commands are directly provided by the processor 102 to the APD 116. In addition, this form of execution allows reuse of groups of commands. Specifically, by transmitting to the APD 116 an indirection command pointing to the same buffer multiple times, the processor 102 is able to forego the load associate with transmitting the commands in such indirection buffer multiple times.

Additional improvement for indirect command buffers is gained through the use of iterative indirect command buffers. Iterative indirect command buffers are command buffers for which the command processor 136 is capable of looping over the contents of the indirect command buffer and is also capable of executing or not executing specific commands of the indirect command buffer. This type of execution provides a great deal of flexibility for the command processor 136 in executing commands.

Figure 4:
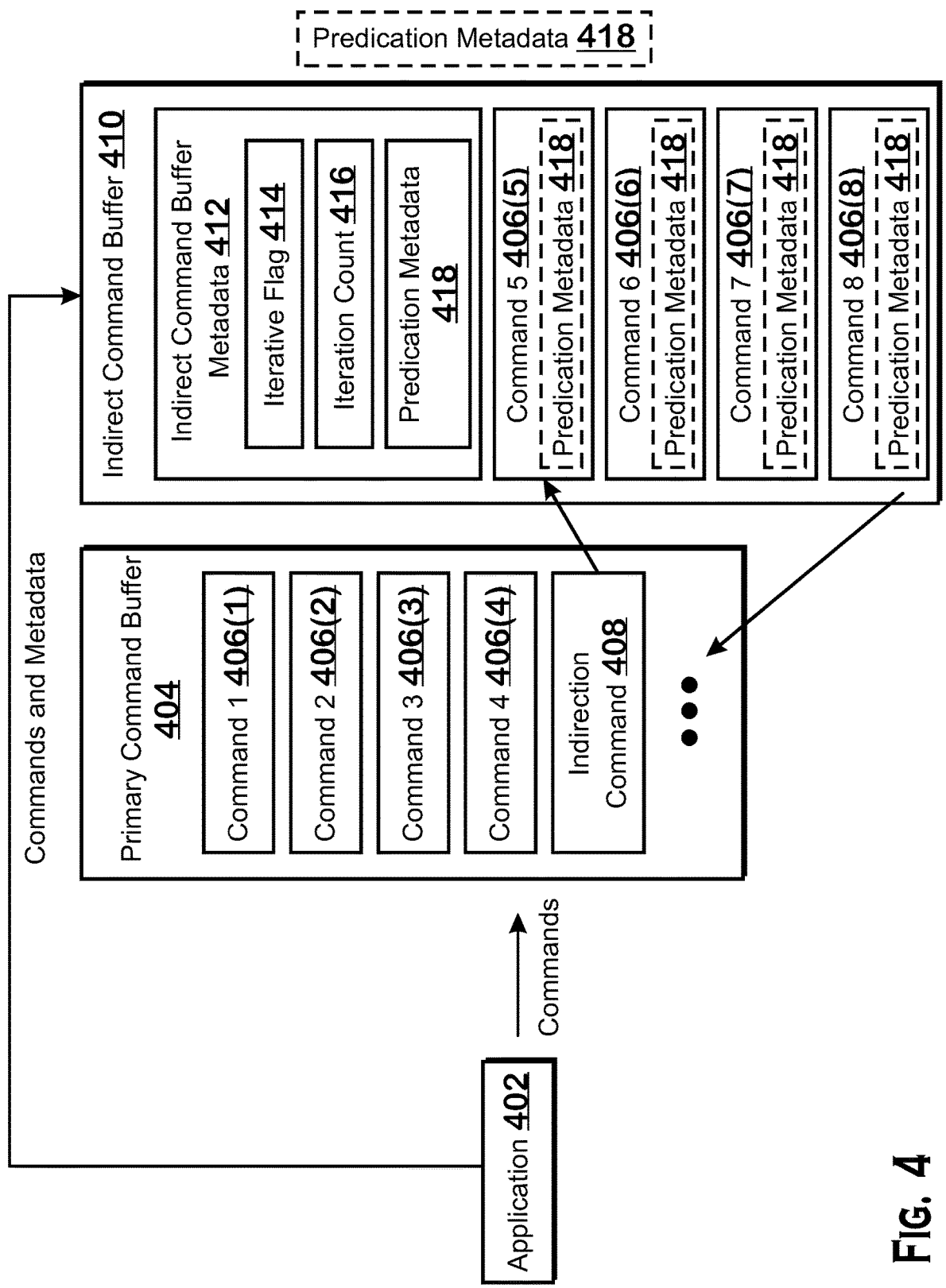
FIG. 4 illustrates operations of iterative indirect command buffers, according to an example.

FIG. 4 illustrates operations of iterative indirect command buffers, according to an example. Specifically, FIG. 4 illustrates an application 402, a primary command buffer 404, and an indirect command buffer 410.

The application 402 is software executing on the processor 102. In some examples, the application 402 is an application 126. In other examples, the application 402 is other software such as the driver 122 or another software entity.

As described elsewhere herein, the application 402 submits commands 406 to be written into the primary command buffer 404. In various examples, the commands include draw commands, compute commands, resource commands. A draw command is a command that instructs the APD 116 to perform graphical rendering operations via the graphics processing pipeline 134. In various examples, these draw commands include commands to render certain geometry such as triangles, meshes, or the like, using the graphics processing pipeline 134 configured in a specified manner. In various examples, the draw commands involve the graphics processing pipeline 134 accepting as input geometry data, processing that geometry data, and outputting an image buffer such as a frame buffer for display on a screen or another image buffer. In various examples, the compute commands include commands that instruct the APD 116 to execute specified compute shader programs on specified input to produce output. The compute shader programs execute on the compute units 132, as specified by the program instructions of the compute shader programs, and process specified input data to generate output data. In various examples, the resource commands include commands to create, delete, copy, or modify "resources," which are memory buffers that are used as either or both of inputs or outputs for draw commands or compute commands. In various examples, the commands 406 include other commands not described herein.

In various examples, the commands to be written into the primary command buffer 404 include indirection commands 408. An indirection command 408 points to an indirect command buffer 410, allowing the command processor 136 to "jump" to an indirect command buffer 410 and execute the commands in the indirect command buffer 410.

The indirect command buffers 410 store commands 406 and indirect command buffer metadata 412. In some implementations, indirect command buffers 410 also include indirection commands 408 that point to other indirect command buffers 410. The commands 406 in the indirect command buffers 410 can be of any type as the commands 406 that can be stored in the primary command buffer 404.

The indirect command buffer metadata 412 includes an iterative flag 414, an iteration count 416, and, in some implementations, predication metadata 418. In other implementations, the predication metadata 418 is stored in one or more of the commands 406 of an indirect command buffer 410, or is stored external to the indirect command buffer 410. The iterative flag 414 indicates whether the indirect command buffer 410 is iterative or not iterative. The iteration count 416 indicates the number of times to iterate over the contents of the indirect command buffer 410. In the situation that an indirect command buffer 410 is iterative (the iterative flag 414 is set), the command processor 136 repeats the contents of the indirect command buffer 410 the number of times indicated by the iteration count 416. The predication metadata 418 indicates which commands 406 the command processor 136 is to execute in any particular iteration.

The nature of the indirect command buffers 410 is such that the application 402 is able to write commands into such indirect command buffers 410 "asynchronously." Here, the term "asynchronously" means that the application 410 does not need to write the commands into the indirect command buffers 410 at the time that those commands are consumed by the command processor 136. Instead, the application 402 is capable of, and does, write commands into the indirect command buffer 410 at a different time, such as before writing commands into the primary command buffer 404. In an example, the application 402 "sets up" indirect command buffers 410 at application startup and/or initialization time. More specifically, at startup and/or initialization time, the application 402 writes commands 406 into one or more indirect command buffers 410 for use when the application 402 actually begins transmitting commands 406 to the primary command buffer 404. In examples, the application 402 modifies the commands 406 in one or more existing indirect commands at runtime (e.g., after startup/initialization), and/or creates new indirect command buffers 410 at runtime.

In addition to writing the commands 406 into the indirect command buffers 410, the application 402 also writes the data of the indirect command buffer metadata 412 into the indirect command buffers 410. The application 402 writes such indirect command buffer metadata 412 into the indirect command buffers 410 in a similar manner as how the application 402 writes the commands 406 into the indirect command buffer 410.

In various examples, the primary command buffer 404 is stored in any technically feasible memory, such as any memory within the APD 116 and/or any memory in the system memory 104. In various examples, the primary command buffer 404 is stored in any technically feasible memory, such as ay memory within the APD 116 and/or any memory in the system memory 104.

The primary command buffer 404 differs from the indirect command buffers 410 in the following manner. The primary command buffer 404 is the buffer that the command processor 136 "defaults" to for executing commands. The command processor 136 executes commands from the primary command buffer 404 unless the command processor 136 has been directed to execute commands from an indirect command buffer 410.

The command processor 136 executes commands 406 in the following manner. The command processor 136 executes the commands 406 in the primary command buffer 404 in sequence. The command processor 136 performs the various operations necessary for such execution, including providing tasks to the graphics processing pipeline 134, scheduling shader programs for execution on the compute units 132, organizing the movement of resources between various memories, and other associated operations.

In response to the command processor 136 encountering an indirection command 408, the command processor 136 jumps to the beginning of the indirect command buffer 410 pointed to by the indirection command 408. The command processor 136 executes the commands 406 in the indirect command buffer 410 in sequence.

To execute the commands 406 in the indirect command buffer 410, the command processor 136 examines the iterative flag 414. If the iterative flag 414 indicates that the indirect command buffer 410 is not iterative, then the command processor 136 executes the commands 406 of the indirect command buffer 410 one time and does not iterate the indirect command buffer 410. If the iterative flag 414 indicates that the indirect command buffer 410 is iterative, then the command processor 136 executes the commands 406 of the indirect command buffer 410 a number of times equal to the iteration count 416.

In any given iteration, the command processor 136 determines which commands 406 are enabled based on the predication metadata 418. Specifically, the predication metadata 418 indicates which commands 406 to execute for any given iteration number. Thus, based on the current iteration number and the predication metadata 418, the command processor 136 executes only those commands designated to execute in the current iteration number (which is tracked by the command processor 136).

In response to the command processor 136 completing execution of an indirect command buffer 410, the command processor 136 returns to the point from which the indirect command buffer 410 was invoked. This point is the indirection command 408 that resulted in the command processor 136 jumping to the indirect command buffer 410. The command processor 136 resumes execution at the command 406 after this point. Note, the indirection command 408 can be either in a primary command buffer 404 or in an indirect command buffer 410. If the iterative flag 414 is not set (iteration is disabled), then execution of an indirect command buffer 410 is completed in the event that the command processor 136 executes the commands 406 of the indirect command buffer 410 once. If the iterative flag is set (iteration is enabled), then execution of an indirect command buffer 410 is completed in the event that the command processor 136 executes the commands 406 of the indirect command buffer 410 a number of times equal to the iteration count 416.

Figure 5:
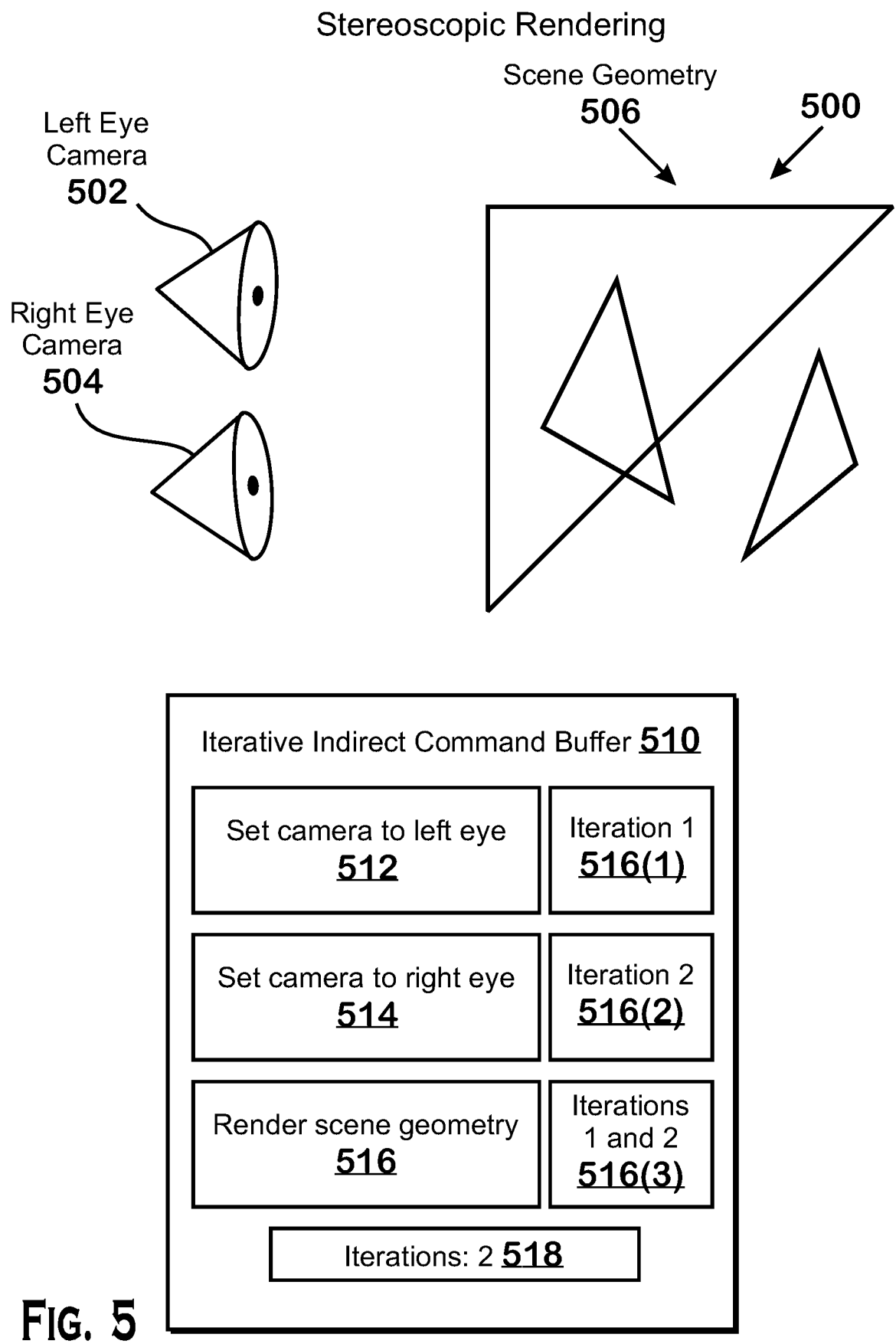
FIG. 5 illustrates a stereoscopic rendering technique, according to an example.
Figure 6:
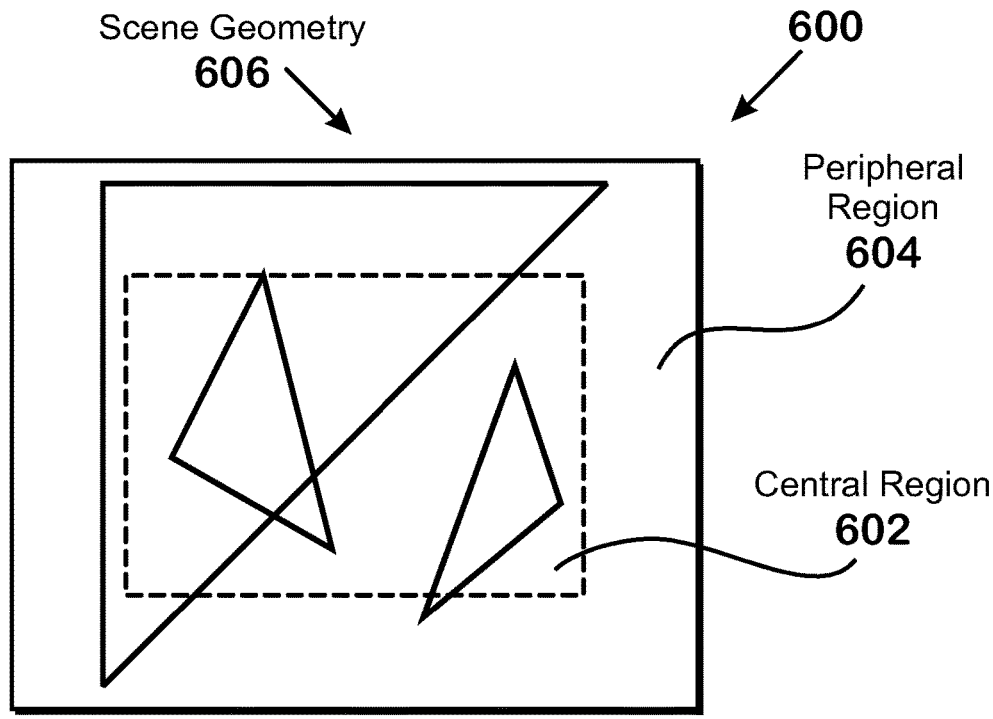
FIG. 6 illustrates another example technique using the iterative indirect command buffer.
Figure 6:
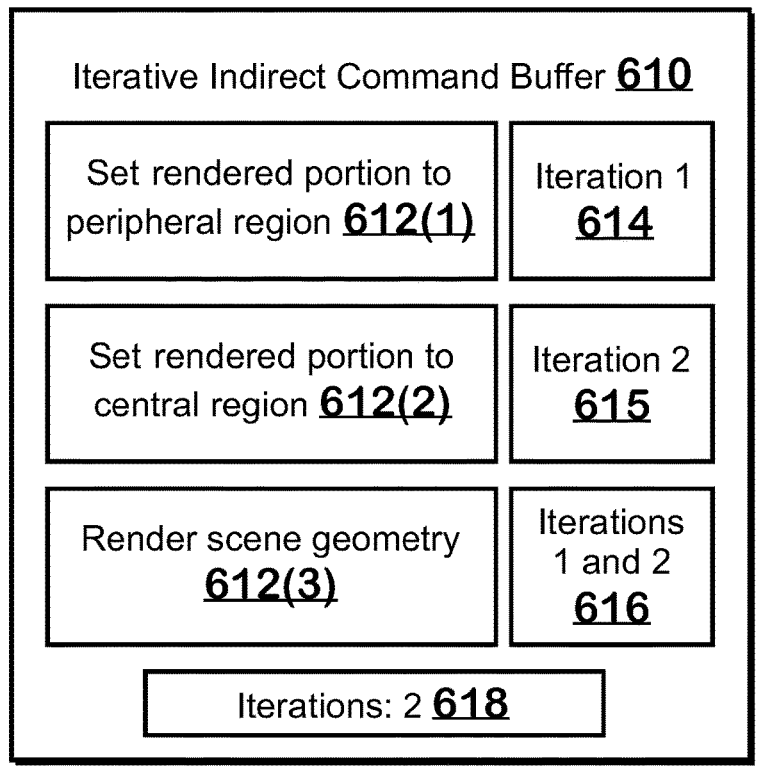
Figure 7:
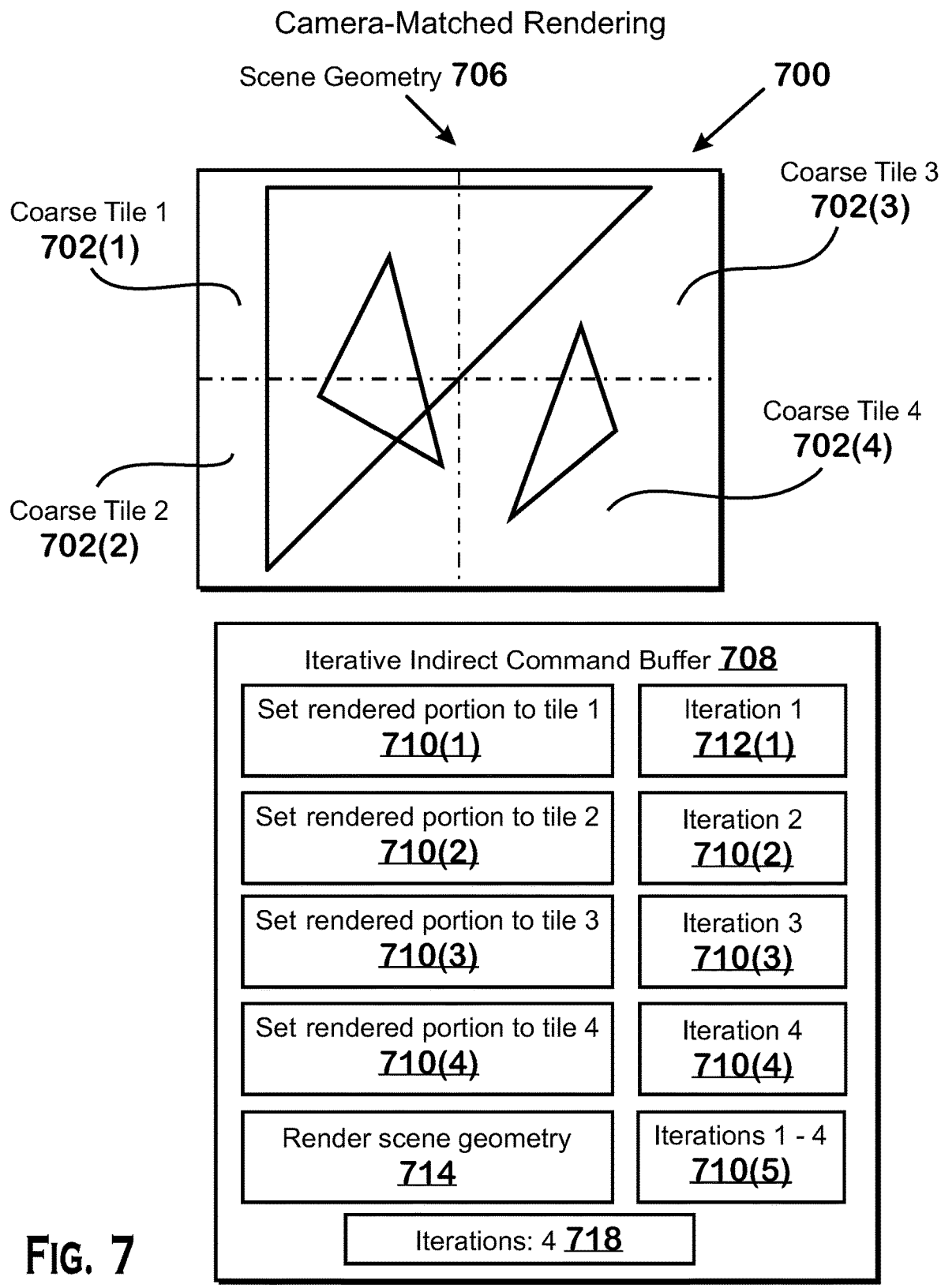
FIG. 7 illustrates another example technique using the iterative indirect command buffer.

FIGS. 5-7 illustrate example techniques in which the iterative indirect command buffer described herein is used. FIG. 5 illustrates a stereoscopic rendering technique, according to an example. In a stereoscopic rendering technique, scene geometry (including, for example, geographical primitives such as triangles and other elements) is rendered one time for each eye to produce a left eye image and a right eye image.

In the technique 500 illustrated, a left eye camera 502 and a right eye camera 504 are shown facing scene geometry 506, which includes triangles to be rendered. One way to render this scene stereoscopically without the use of iterative indirect command buffers is to submit a command to set the camera to the position and orientation of the left eye, then submit commands to render all scene geometry, then submit a command to set the camera to the position and orientation of the right eye, and then submit commands to render all scene geometry. As can be seen, however, such a scheme requires that the commands to render all scene geometry is written by the processor 102 twice. Specifically, without the use of iterative indirect command buffers, the processor 102 transmits these render commands to the APD 116 for execution twice.

With the technique 500 of FIG. 5, an iterative indirect command buffer 510 as shown allows the processor 102 to forego repeatedly transmitting the commands to render scene geometry to the APD 116. The iterative indirect command buffer 510 includes a command 512 to set the camera to the left eye, a command 514 to set the camera to the right eye, and a command 516 to render the scene geometry 516. Further, the iterative indirect command buffer 510 includes predication metadata 516 for each of the commands. The first predication metadata 516(1) instructs the APD 116 to execute the command 512 for the first iteration but not the second iteration. The second predication metadata 516(2) instructs the APD 116 to execute the command 514 for the second iteration but not for the first iteration. The third predication metadata 516(3) instructions the APD 116 to render the scene geometry. The buffer 510 also includes iteration metadata 518 indicating the number of iterations to loop over the buffer 510. In operation, the APD 116 executes the command 512 to set the camera to the left eye and the command to render scene geometry 516, but not the command to set the camera to the right eye 514. In the second iteration, the APD 116 executes the command 514 to set the camera to the right eye and the command to render scene geometry 516, but not the command to set the camera to the left eye 512.

FIG. 6 illustrates another example technique 600 using the iterative indirect command buffer. Specifically, FIG. 6 illustrates a camera-matched rendering technique. According to the camera-matched rendering technique, different portions of an image are rendered with different settings (e.g., with different resolutions), in an attempt to match the visual qualities of a camera lens. In the example of FIG. 6, a central region 602 and a peripheral region 604 are illustrated, and scene geometry 606 are illustrated as well.

In the example, the iterative indirect command buffer 610 includes commands 612 and metadata items 614, 615, and 616. The command buffer 610 also includes iteration number information 618. The command 612(1) sets the rendered portion to the peripheral region 604. The command 612(2) sets the rendered portion to the central region 602. The command 6123) renders the scene geometry 612(3). In iteration 1, APD 116 executes command 612(1) to set the rendered portion to the peripheral region 604 and executes command 612(3) to render the scene geometry. This rendering occurs for the peripheral region 604 but not the central region 602, and occurs with settings specified by command 612(1). In iteration 2, APD 116 executes command 612(2) to set the rendered portion to the central region 602 and executes command 612(3) to render the scene geometry. This rendering occurs for the peripheral region 604 but not the central region 602. Due to the iteration number information 618, execution of the iterative indirect command buffer 610 occurs twice.

FIG. 7 illustrates another example technique 700 using the iterative indirect command buffer. The technique 700 is a coarse binning technique in which geometry rendering is ordered by coarse tiles 702. More specifically, scene geometry 706 is divided into different coarse tiles 702, and the APD 116 processes this geometry tile-by-tile.

Four tiles 702 are illustrated, each including a portion of the scene geometry 706. The iterative indirect command buffer 708 includes a command 710 to set the rendered portion to the corresponding tile 702, for each such tile 702. Further, the predication metadata 712 indicates, for each such command 710, that those commands 710 are to be executed in a different iteration. In addition, the iterative indirect command buffer 708 includes a render scene geometry command 715. The render scene geometry command 715 causes the APD 116 to render the scene geometry using the coarse tile 702 set via the command 710 of the current iteration. The iterative indirect command buffer 708 also includes an iteration number 718 indicating that the number of iterations is 4. The illustrated iterative indirect command buffer 708 causes the APD 116 to loop through the command buffer 708, rendering the scene geometry for each coarse tile 702.

Figure 8:
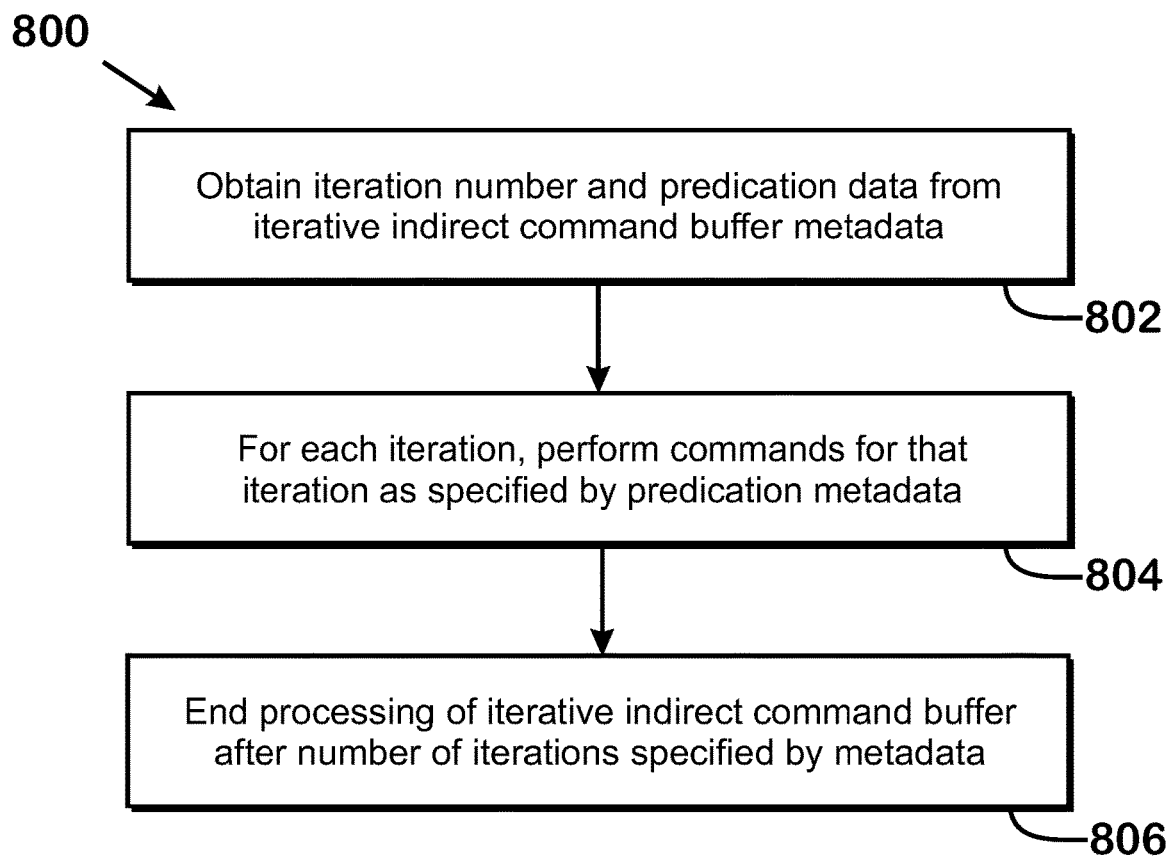
FIG. 8 is a flow diagram of a method for performing commands of an iterative indirect command buffer, according to an example.

FIG. 8 is a flow diagram of a method 800 for performing commands of an iterative indirect command buffer, according to an example. Although described with respect to the systems of FIGS. 1-7, those of skill in the art will recognize that any system, configured to perform the steps of the method 800 in any technically feasible order, falls within the scope of the present disclosure.

The method 800 begins at step 802, where an APD 116 obtains an iteration number and predication data for an iterative indirect command buffer 410. As stated above, the iteration number indicates the number of times that the APD 116 iterates over the indirect command buffer 410. The predication data indicates, for each iteration number, which commands of the indirect command buffer 410 the APD 116 will execute.

At step 804, for each iteration indicated by the iteration number, the APD 116 performs the commands for that iteration as specified by the predication metadata. For commands where the predication metadata indicates the command is not to be executed, the APD 116 does not perform those commands. For commands where the predication metadata indicates the command is to be executed, the APD performs those commands. At step 806, the APD 116 ends processing of the iterative indirect command buffer 410 after the number of iterations specified by the metadata have been completed. In various situations, the APD 116 returns from the iterative indirect command buffer 410, continuing to process commands and the returned location, if those commands exist.

Each of the units illustrated in the figures represent hardware circuitry configured to perform the operations described herein, and certain units of the graphics processing pipeline 300 are programmable and can thus execute programs.

It should be understood that many variations are possible based on the disclosure herein. Although features and elements are described above in particular combinations, each feature or element can be used alone without the other features and elements or in various combinations with or without other features and elements.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for executing commands for an accelerated processing device (APD), the method comprising:
executing commands in a primary command buffer;
asynchronously loading commands into an indirect command buffer;
in response to an indirection command in the primary command buffer pointing to the indirect command buffer, beginning execution of the indirect command buffer;
in response to the indirect command buffer including an iterative flag indicating that iteration should occur, executing commands in the indirect command buffer in an iterative manner, the executing including:
obtaining an iteration number and predication data from metadata for the indirect command buffer;
for each iteration indicated by the iteration number, performing the commands in the indirect command buffer as specified by the predication data; and
ending processing of the commands in the indirect command buffer and returning execution to the primary command buffer in response to processing a number of iterations equal to the iteration number.

2. The method of claim 1, wherein the predication data indicates which commands of the indirect command buffer are to be performed for each iteration.

3. The method of claim 1, wherein performing the commands of the indirect command buffer as specified by the predication data comprises, for each iteration, performing commands indicated to be performed for that iteration and not performing commands not indicated to be performed for that iteration.

4. The method of claim 1, further comprising:
in response to ending processing of the indirect command buffer, returning to a point from which control flow transferred to the indirect command buffer.

5. The method of claim 1, further comprising:
writing commands, the iteration number, and the predication data into the indirect command buffer.

6. The method of claim 1, wherein the indirect command buffer includes commands for a stereoscopic rendering technique.

7. The method of claim 1, wherein the indirect command buffer includes commands for a coarse binning technique.

8. The method of claim 1, wherein the indirect command buffer includes commands for a camera-matched rendering technique.

9. A command processor comprising:
a processor;
a memory interface configured to fetch commands from a primary command buffer; and
a memory interface configured to fetch commands and metadata from an indirect command buffer configured to asynchronously store commands,
wherein the processor is configured to:
execute commands in the primary buffer;
in response to an indirection command in the primary command buffer pointing to the indirect command buffer, beginning execution of the indirect command buffer;
in response to the indirect command buffer including an iterative flag indicating that iteration should occur, execute commands in the indirect command buffer in an iterative manner, the executing including:
obtain an iteration number and predication data from the metadata for the indirect command buffer;
for each iteration indicated by the iteration number, perform commands in the indirect command buffer as specified by the predication data; and
end processing of the commands in the indirect command buffer and return execution to the primary command buffer in response to processing a number of iterations equal to the iteration number.

10. The command processor of claim 9, wherein the predication data indicates which commands of the indirect command buffer are to be performed for each iteration.

11. The command processor of claim 9, wherein performing the commands of the indirect command buffer as specified by the predication data comprises, for each iteration, performing commands indicated to be performed for that iteration and not performing commands not indicated to be performed for that iteration.

12. The command processor of claim 9, wherein the processor is further configured to:
in response to ending processing of the indirect command buffer, return to a point from which control flow transferred to the indirect command buffer.

13. The command processor of claim 9, wherein the processor is further configured to:
write commands, the iteration number, and the predication data into the indirect command buffer.

14. The command processor of claim 9, wherein the indirect command buffer includes commands for a stereoscopic rendering technique.

15. The command processor of claim 9, wherein the indirect command buffer includes commands for a coarse binning technique.

16. The command processor of claim 9, wherein the indirect command buffer includes commands for a camera-matched rendering technique.

17. An accelerated processing device comprising:
a compute unit; and
a command processor comprising:
a processor;
a memory interface configured to fetch commands from a primary command buffer; and
a memory interface configured to fetch commands and metadata from an indirect command buffer configured to asynchronously store commands, wherein the commands include one or more commands for execution on the compute unit,
wherein the processor is configured to:
execute commands in the primary buffer;
in response to an indirection command in the primary command buffer pointing to the indirect command buffer, beginning execution of the indirect command buffer;
in response to the indirect command buffer including an iterative flag indicating that iteration should occur, executing commands in the indirect command buffer in an iterative manner, the executing including:
obtain an iteration number and predication data from the metadata for the indirect command buffer;
for each iteration indicated by the iteration number, perform commands in the indirect command buffer as specified by the predication data; and
end processing of the commands in the indirect command buffer and return execution to the primary command buffer in response to processing a number of iterations equal to the iteration number.

18. The accelerated processing device of claim 17, wherein the predication data indicates which commands of the indirect command buffer are to be performed for each iteration.

* * * * *